US007599334B2

(12) United States Patent
Odenwalder et al.

(10) Patent No.: US 7,599,334 B2
(45) Date of Patent: Oct. 6, 2009

(54) METHOD AND APPARATUS FOR PROCESSING SHARED SUB-PACKETS IN A COMMUNICATION SYSTEM

(75) Inventors: Joseph P. Odenwalder, Rancho Santa Fe, CA (US); Edward G. Tiedemann, Jr., Concord, MA (US); Tao Chen, San Diego, CA (US); Stein A. Lundby, Solana Beach, CA (US); Yongbin Wei, San Diego, CA (US); David Puig Oses, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/981,027

(22) Filed: Oct. 15, 2001

(65) Prior Publication Data

US 2003/0072296 A1 Apr. 17, 2003

(51) Int. Cl.
H04B 7/216 (2006.01)
(52) U.S. Cl. ....................... 370/335; 370/342
(58) Field of Classification Search ................ 370/389,
370/441–445, 335–336, 342–345, 347, 337,
370/332, 310, 328, 329, 330, 341, 331, 431,
370/432
See application file for complete search history.

(56) References Cited

U.S. PATENT DOCUMENTS

| 4,901,307 | A | | 2/1990 | Gilhousen et al. |
| 5,103,459 | A | | 4/1992 | Gilhousen et al. |
| 5,357,513 | A | * | 10/1994 | Kay et al. ................ 370/332 |
| 5,504,773 | A | | 4/1996 | Padovani et al. |
| 5,513,183 | A | * | 4/1996 | Kay et al. ................ 370/337 |
| 6,091,717 | A | * | 7/2000 | Honkasalo et al. .......... 370/329 |
| 6,161,014 | A | | 12/2000 | Girardean et al. |
| 6,381,454 | B1 | | 4/2002 | Tiedemann et al. |
| 6,385,188 | B1 | | 5/2002 | Kim et al. |
| 6,546,243 | B2 | | 4/2003 | Tiedemann et al. |
| 6,574,211 | B2 | | 6/2003 | Padovani et al. |
| 6,594,273 | B1 | * | 7/2003 | McGibney ................ 370/442 |
| 6,665,309 | B2 | * | 12/2003 | Hsu et al. ................ 370/441 |
| 7,020,091 | B2 | * | 3/2006 | Kenney et al. ............ 370/250 |
| 7,023,899 | B2 | * | 4/2006 | Das et al. ................ 375/146 |
| 7,167,461 | B2 | * | 1/2007 | Odenwalder et al. ........ 370/335 |
| 2002/0167992 | A1 | * | 11/2002 | Das et al. ................ 375/146 |

(Continued)

OTHER PUBLICATIONS

Ghosh et al. "Air-Interface for 1XTREME /1xEV-DV". Vehicular Technology Conference, Rhodes, GR, vol. 4, May 6-9, 2001, pp. 2474-2478.

(Continued)

Primary Examiner—Ayaz R Sheikh
Assistant Examiner—Chuong T Ho
(74) Attorney, Agent, or Firm—Pavel Kalousek; Larry J. Moskowitz

(57) ABSTRACT

Method and Apparatus for Processing Shared Sub-packets in a Communication System are disclosed. A communication system providing both voice and data services allows for a plurality of subscriber station to share a data sent in a unit of a forward traffic channel. To provide information required by the subscriber stations to determine that a unit of the forward traffic channel is shared, and to correctly decode the data, different control channel structures are described. Additionally, the control channel structures provides for more efficient signaling of code channel assignment.

49 Claims, 7 Drawing Sheets

U.S. PATENT DOCUMENTS

| | | | |
|---|---|---|---|
| 2003/0031149 A1* | 2/2003 | Odenwalder et al. | 370/337 |
| 2003/0031230 A1 | 2/2003 | Kwon et al. | |
| 2003/0039204 A1 | 2/2003 | Tiedemann | |
| 2003/0063606 A1* | 4/2003 | Odenwalder et al. | 370/389 |
| 2003/0072305 A1* | 4/2003 | Odenwalder et al. | 370/389 |
| 2005/0047377 A1* | 3/2005 | Odenwalder et al. | 370/337 |

OTHER PUBLICATIONS

Ghosh et al., "Performance of coded higher order modulation and hybrid ARQ for next generation cellular CDMA systems" 52nd Vehicular Technology Conference, vol. 2, Oct. 24-28, 2000, pp. 500-505, XP010525438, Boston, US.

"1XTREME Physical Specification for Integrated Data and Voice Services in cdma2000 Spread Spectrum Systems" Proposal to 3GPP2, WG5 by LSI Logic, Texas Instruments, Nokia and Motorola, No. C50-20011204-021, Dec. 8, 2000, pp. 4.1-4.72, XP002226831, Kauai, US.

International Search Report, PCT/US02/32055, ISA-EP, Feb. 6, 2003.

"Updated Joint Physical Layer Proposal for 1xEV-DV," submitted to 3GPP2 as document No. C50-20010611-009, Jun. 11, 2001. (1XEV-DV proposal).

* cited by examiner

METHOD AND APPARATUS FOR PROCESSING SHARED SUB-PACKETS IN A COMMUNICATION SYSTEM

BACKGROUND

1. Field

The present invention relates generally to communication systems, and more specifically to a method and an apparatus for processing shared sub-packets in a communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the TIA/EIA/IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the TIA/EIA/IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the TIA/EIA/MS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system that conforms to the TIA/EIA/TIA/EIA/IS-895 industry standard, hereinafter referred to as the TIA/EIA/IS-895 standard. This HDR system is based on a communication system disclosed in co-pending application serial number 08/963,386, entitled "METHOD AND APPARATUS FOR HIGH RATE PACKET DATA TRANSMISSION," filed Oct. 3, 1997, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

Existing voice/data communication systems generally utilize voice traffic channels for conducting voice telephony or data communications including small file transfer, electronic mail, and facsimile. Consequently, the data transmission rate is limited. For example, in the above-mentioned communication system in accordance with the TIA/EIA/IS-95 standard provides for establishing multiple traffic channels, each having a rate of data up to 14.4 kilobits per second. While 14.4 kilobits per second is adequate for the above-mentioned types of lower data rate applications, the increasing popularity of more data intensive applications such as worldwide web and video conferencing has created a demand for much higher data transmission rates. The communication system in accordance with the TIA/EIA/IS-895 standard satisfies the data rate requirement, but allows for data transmission only. To satisfy the demand for data transmission while retaining voice service capability, several communication systems have been proposed.

One such a communication system is the above mentioned communication system in accordance with the W-CDMA standard. Another communication system is described in a proposal submitted by LG Electronics, LSI Logic, Lucent Technologies, Nortel Networks, QUALCOMM Incorporated, and Samsung to the $3^{rd}$ Generation Partnership Project 2 (3GPP2). The proposal is detailed in documents entitled "Updated Joint Physical Layer Proposal for 1xEV-DV," submitted to 3GPP2 as document number C50-20010611-009, Jun. 11, 2001, and "Updated Joint Physical Layer Proposal for 1xEV-DV," file L3NQS_Physical_Layer_v09.doc, Aug. 20, 2001, hereinafter referred to as 1xEV-DV proposal. Yet another communication system is described in a proposal to the 3GPP2 submitted by Motorola, Nokia, Texas Instruments, and LSI Logic. The proposal is detailed in document entitled "1XTREME Physical Layer Specification for Integrated Data and Voice Services in cdma2000 Spread Spectrum Systems," submitted to 3GPP2 as document number C50-20001204-021, Dec. 8, 2000.

The 1xEV-DV proposal provides an air interface between a plurality of subscriber stations and a plurality of subscriber stations enabling a simultaneous voice and data services. For that purpose, the 1xEV-DV proposal defines a set of forward and reverse channels.

The structure of reverse channels transmitted by base stations is illustrated in FIG. 1. The reverse Pilot Channel, the Dedicated Control Channel, and the Fundamental Channel remain unchanged. The Supplemental Channel structure remains unchanged for Radio Configurations 1 through 6. The new reverse control channels are the Reverse Rate Indicator Channel (R-RICH), the Reverse Channel Quality Indicator Channel (R-CQICH), and the Reverse Acknowledgment Channel (R-ACKCH).

The structure of forward channels transmitted by base stations is illustrated in FIG. 2. The Forward Pilot Channel, Transmit Diversity Pilot Channel, Auxiliary Pilot Channel, Auxiliary Transmit Diversity Pilot Channel, Synch Channel, Paging Channel, Broadcast Control Channel, Quick Paging Channel, Common Power Control Channel, Common Assignment Channel, Dedicated Control Channel, Forward Fundamental Channel, Forward Supplemental Channel, and Forward Supplemental Code Channels are the same as their counterparts in the above-mentioned IS-2000 standard. The Forward Packet Data Channel, the optional Forward Primary Packet Data Control Channel, and the Forward Secondary Packet Data Control Channel are channels defined for 1xEV-DV packet data operation.

The data services are provided to a subscriber station on a Forward Packet Data Channel (F-PDCH), which is shared by packet data users based on time multiplexing. The F-PDCH is composed of a number of code-division-multiplexed Walsh sub-channels. The number of sub-channels varies in time depending on the demands of the circuit-switched voice and data users. The F-PDCH structure is illustrated in FIG. 3. The information bit stream 302 to be transmitted is segmented into packets of several sizes. A 16-bit cyclic redundancy check (CRC) is added to each packet in block 304, and 6-bit turbo encoder tail allowance is added in block 306 yielding an encoder packet. In one embodiment, the encoder packets are of sizes 384 bits, 768 bits, 1,536 bits, 2,304 bits, 3,072 bits, and 3,840 bits. The encoder packets are encoded by block 308. Each encoded packet is then scrambled in blocks 310 by a scrambling pattern generated by block 312 and interleaved by block 314. Some or all of the interleaved symbols are then selected to form sub-packets in block 316. Depending on the length of the sub-packet, the sub-packet comprises 1, 2, 4, or 8 slots. In one embodiment, the slot is 1.25 ms long. The sub-packet are QPSK, 8-PSK, or 16-QAM modulated by block 318 and demultiplexed into a variable number of pairs (In-phase and Quadrature) of parallel streams by block 320. Each of the parallel streams is covered with a distinct 32-ary Walsh function by blocks 322($i$). The Walsh-coded symbols of all the streams are summed together to form a single In-phase stream and a single Quadrature stream by block 324. The In-phase stream and the Quadrature streams are provided to a block 326, which adjusts the channel's gain. Several forward link channels, both data and voice are then summed in block 328, quadtrature spread in block 330, and the resultant In-phase and Quadrature streams are baseband filtered in block 332($i$), upconverted in blocks 334($i$) and summed in block 336.

The F-PDCH is controlled by a Forward Primary Packet Data Control Channel (F-PPDCCH) if used and by a Forward Secondary Packet Data Control Channel (F-SPDCCH).

The F-PPDCCH is transmitted during the first slot of F-PDCH transmissions, and carries a 2-bit field that indicates the F-PDCH sub-packet length. One of ordinary skills in the art recognizes that because the F-PPDCCH carries only information of the F-PDCH sub-packet length, the use of the F-PPDCCH is optional. The subscriber station may use other means for determining the F-PDCH sub-packet length. Thus, for example, the subscriber station may decode the sub-packet for all sub-packet length hypotheses, and select the most likely one of the hypothesis.

The F-SPDCCH is transmitted over 1, 2, or 4 slots, and the starts of the F-SPDCCH transmissions are aligned with the starts of the corresponding F-PDCH transmissions. The F-SPDCCH carries bits specifying a medium access control (MAC) identifier (ID), the Automatic Repeat reQuest (ARQ) channel ID, the encoder packet size, and the F-PDCH sub-packet ID.

The 1xEV-DV proposal thus allows the base station to send data to multiple mobiles only on a single slot granularity. Furthermore, the highest sub-packet data rate that is allowed for 384-bit packets is 307.2 kbps with one slot per sub-packet. So even when mobiles are capable of receiving higher data rates, they are limited to at most 307.2 kbps and use at least one slot.

Similarly, the 1XTREME proposal provides an air interface between a plurality of subscriber stations and a plurality of subscriber stations enabling a simultaneous voice and data services. The 1XTREME proposal uses a fixed sub-packet size of 5 ms for the packet data channels and for the control channels associated with the packet data channels. The packet data sub-packets can be CDM shared, but there is no flexibility on the duration of the data or control sub-packets. The packet data channel is controlled with a dedicated CDM channel for each user, called the Forward Dedicated Pointer Channel, and with a shared control channel, called the Forward Shared Control Channel.

The fixed-duration shared packet data sub-packet and limited control of the 1XTREME or 1xEV-DV proposals waste resources and limits the system throughput performance. Consequently, there is a need in the art for a method and an apparatus for improving the throughput of the system by allowing multiple forward-link transmissions per a slot.

SUMMARY

In one aspect of the invention, the above-stated needs are addressed by generating a first control channel comprising an indicator that a traffic channel is to be shared and parameters of the traffic channel; and generating at least one second control channel, each of said at least one second control channel comprising an identity of at least one subscriber station and information enabling the subscriber station to demodulate the traffic channel.

In another aspect of the invention, the above-stated needs are addressed by demodulating a first control channel to determine whether a traffic channel is to be shared; determining a number of subscriber stations sharing a traffic channel and multiplexing of the traffic channel in accordance with said demodulated control channel if the traffic channel is to be shared; demodulating a second control channel comprising identity of a subscriber station, and information enabling a subscriber station to demodulate a traffic channel; and demodulating the traffic channel in accordance with said determined multiplexing and the enabling information if the acquired identity is identical to an identity of the subscriber station.

DETAILED DESCRIPTION

Definitions

Figure 1:
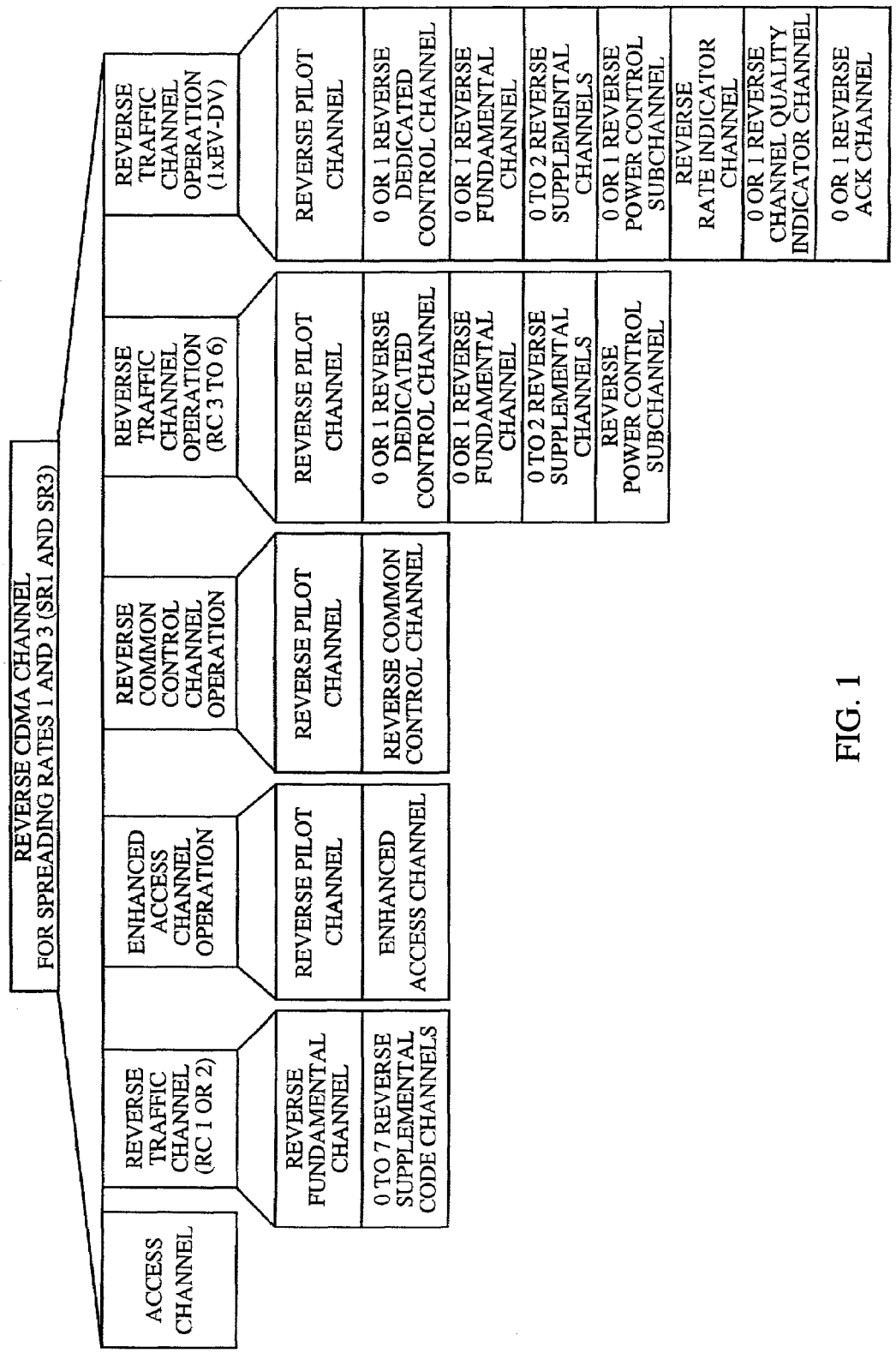
FIG. 1 illustrates a structure of reverse channels transmitted by base stations.
Figure 2:
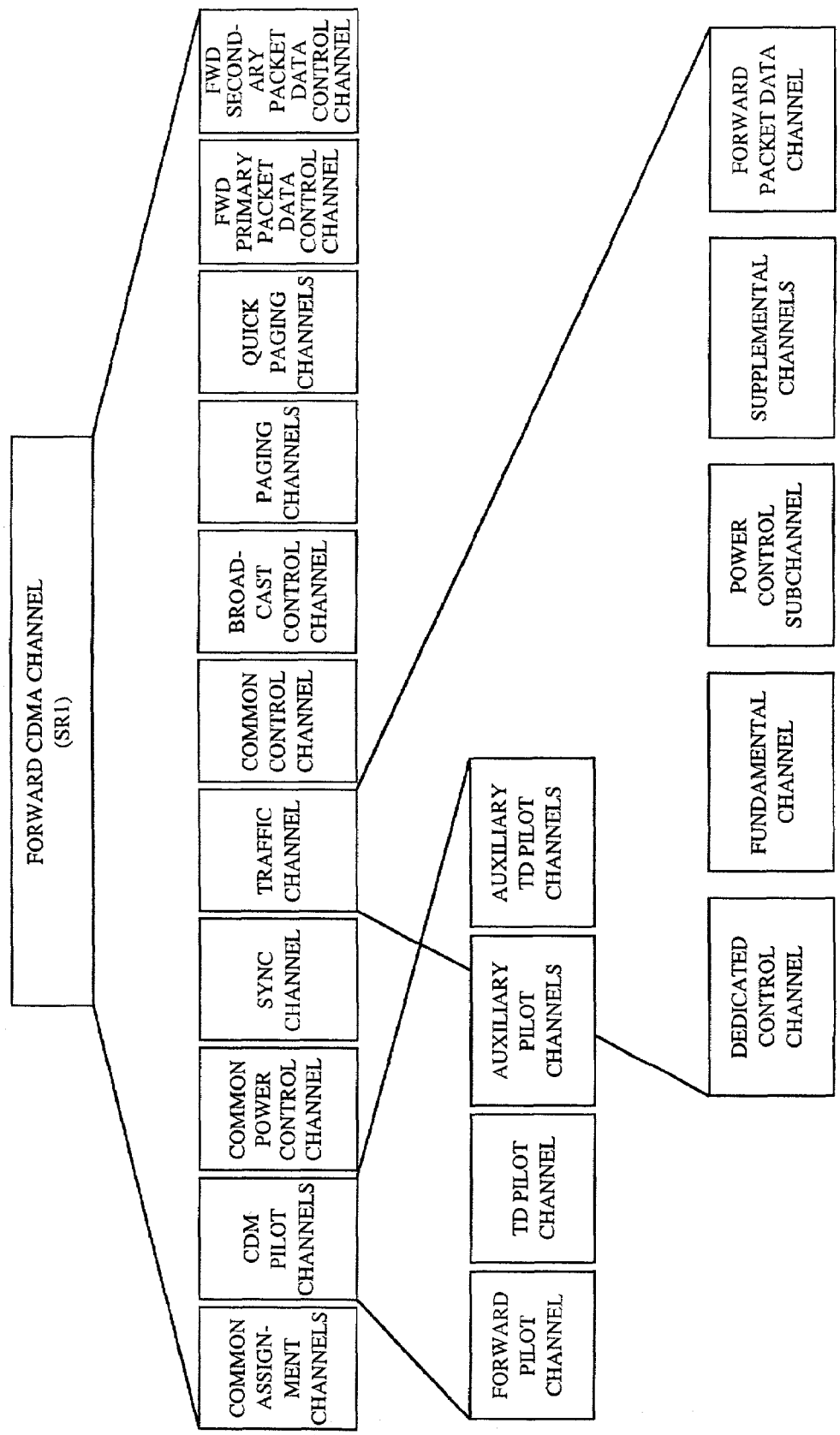
FIG. 2 illustrates a structure of forward channels transmitted By base stations.
Figure 3:
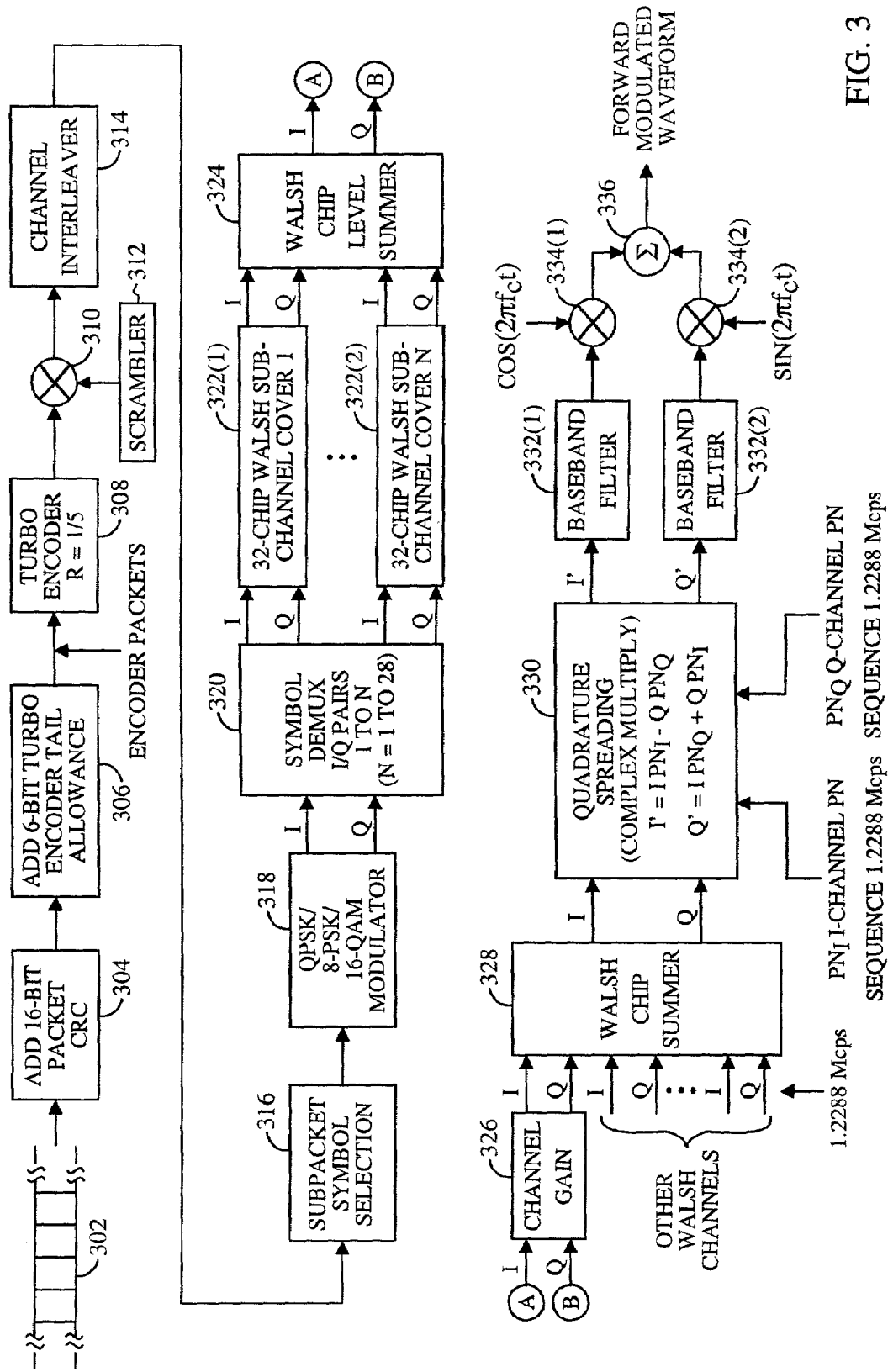
FIG. 3 illustrates an exemplary forward packet data channel.

The word "exemplary" is used exclusively herein to mean "serving as an example, instance, or illustration." Any embodiment described herein as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (AP) and one or more access point controllers. The access network transports data packets between multiple access terminals (AT). The access network may be further connected to additional networks outside the access network, such as a corporate intranet or the Internet, and may transport data packets between each access terminal and such outside networks.

The term base station, referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link is used exclusively herein to mean a single route over which a signal is transmitted described in terms of modulation characteristics and coding, or a single route within the protocol layers of either the AP or the AT.

The term reverse channel/link is used exclusively herein to mean a communication channel/link through which the AT sends signals to the AP.

A forward channel/link is used exclusively herein to mean a communication channel/link through which an AP sends signals to an AT.

The term soft hand-off is used exclusively herein to mean a communication between a subscriber station and two or more sectors, wherein each sector belongs to a different cell. In the context of TIA/EIA/IS-95 standard, the reverse link communication is received by both sectors, and the forward link communication is simultaneously carried on the two or more sectors' forward links. In the context of the TIA/EIA/IS-895 standard, data transmission on the forward link is non-simultaneously carried out between one of the two or more sectors and the AT.

The term softer hand-off is used exclusively herein to mean a communication between a subscriber station and two or more sectors, wherein each sector belongs to the same cell. In the context of the TIA/EIA/IS-95 standard, the reverse link communication is received by both sectors, and the forward link communication is simultaneously carried on one of the two or more sectors' forward links. In the context of the TIA/EIA/IS-895 standard, data transmission on the forward link is non-simultaneously carried out between one of the two or more sectors and the AT.

The term re-pointing is used exclusively herein to mean a selection of a sector that is a member of an ATs' active list, wherein the sector is different than a currently selected sector.

The term soft/softer hand-off delay is used exclusively herein to indicate the minimum interruption in service that a subscriber station would experience following a handoff to another sector. Soft/Softer handoff delay is determined based on whether the sector, (currently not serving the subscriber station), (non-serving sector) to which the subscriber station is re-pointing is part of the same cell as the current serving sector. If the non-serving sector is in the same cell as the serving sector then the softer handoff delay is used, and if the non-serving sector is in a cell different from the one that the serving sector is part of then the soft-handoff delay is used.

The term non-homogenous soft/softer hand-off delay is used exclusively herein to indicate that the soft/softer hand-off delays are sector specific and therefore may not be uniform across the sectors of an Access Network.

The term credit is used exclusively herein to mean a dimensionless attribute indicating a quality metric of a reverse link, a quality metric of a forward link, or a composite quality metric of both forward and reverse links.

The term erasure is used exclusively herein to mean failure to recognize a message.

The term outage is used exclusively herein to mean a time interval during which the likelihood that a subscriber station will receive service is reduced.

The term fixed rate mode is used exclusively herein to mean that a particular sector transmits a Forward Traffic Channel to the AT at one particular rate.

Description

The present invention utilizes the sub-packet structure as defined in the 1xEV-DV proposal, but further divides the sub-packet granularity. Throughout the following description, the channels are discussed in terms of structure required for understanding the concept of the invention. Consequently, one of ordinary skills in the art appreciates that the channel structure may contain additional elements required for transmission, e.g., CRC, encoder tail bits, and other blocks known to one of ordinary skills in the art.

Figure 4:
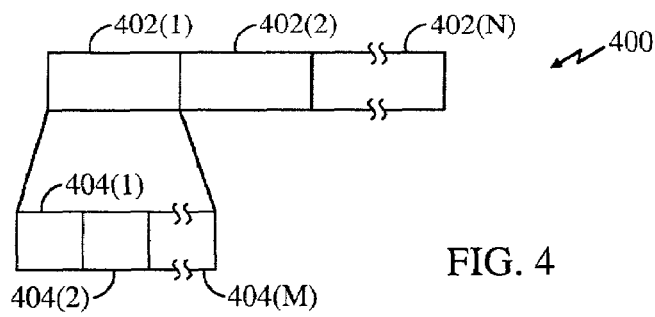
FIG. 4 illustrates a sub-packet structure in accordance with one embodiment.

FIG. 4 illustrates sub-packet structure in accordance with one embodiment. The sub-packet 400 comprises one or more slots 402($i$). Each of the slots 402($i$) is further time-divided into sub-slots 404($i$). (Only one slot sub-division is shown.) In one embodiment, there are 2, 4 or 8 equal sub-slots 404($i$). However, one skilled in the art understands that the sub division is an implementation choice and other sub-divisions are within the scope of the invention. The data to a subscriber station are provided in one or more of the sub-slots 404($i$). Each subscriber station can use a number of sub-slots 404($i$), and the number of sub-slots for each subscriber station utilizing each of the sub-packets 402($i$) can be different.

Figure 5:
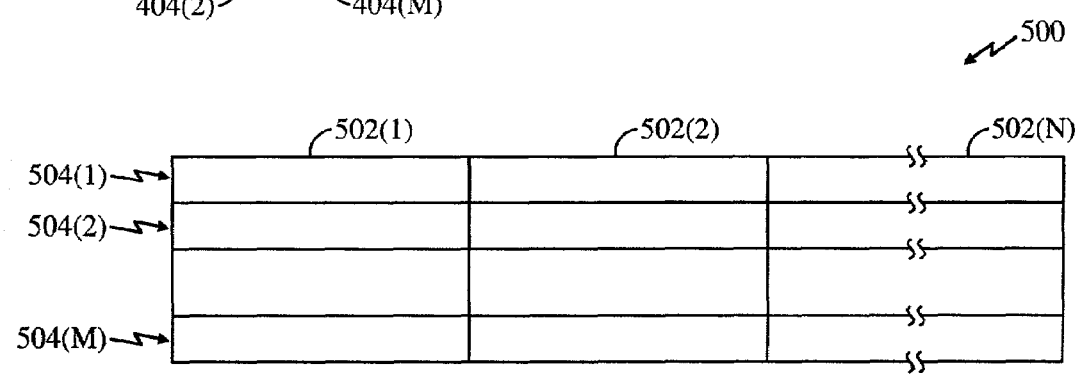
FIG. 5 illustrates a sub-packet structure in accordance with one embodiment.

In accordance with another embodiment, illustrated in FIG. 5, the slot(s) 502($i$) of the sub-packet 500 contain data for several subscriber stations. Data from all the slots 502($i$) of the sub-packet 500 for a particular mobile are sent using one or more of the available Walsh channels. As illustrated in FIG. 5, slots 402(1)-402($n$) contain data encoded by Walsh codes 504(1)-504($m$), therefore, carry data for m subscriber stations. Consequently, the number of subscriber stations receiving information concurrently may be changed on a sub-packet to sub-packet basis.

Control Structures

Due to the variability of the structure of the F-PDCH as described above, a subscriber station must be provided with information enabling the subscriber station to demodulate the F-PDCH. In one embodiment utilizing the code-division of the sub-packets, the existing structures of the F-PPDCCH and the F-SPDCCH can be utilized. One skilled in the art appreciates that although the following description describes modifications of the F-PPDCCH and the F-SPDCCH, this is for tutorial purposes only, and new channels in accordance with the described embodiments can be defined. Additional information is carried on one or more new channels.

Figure 6:
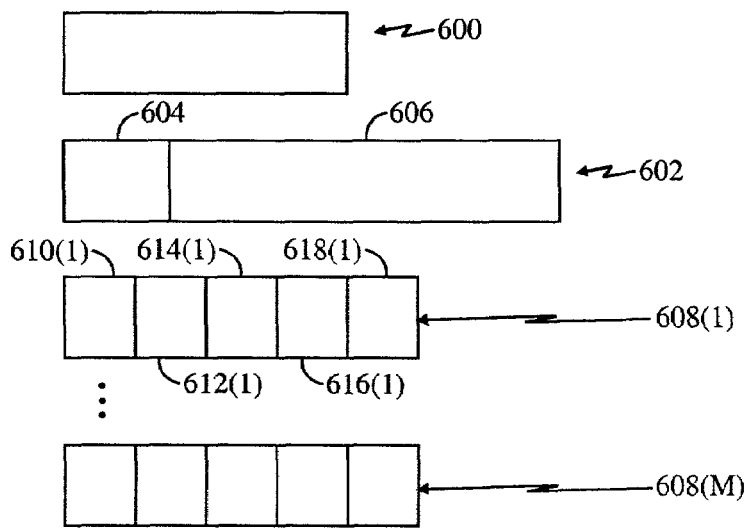
FIG. 6 illustrates a control channel structure in accordance with one embodiment.

FIG. 6 illustrates a control channel structure in accordance with one embodiment, comprising the F-PPDCCH 600, the F-SPDCCH 602, and one CDM control channel 608($i$) for each of the subscriber stations sharing the sub-packet. The F-PPDCCH 600 is utilized as defined in the 1xEV-DV proposal. One of ordinary skills in the art recognizes that because the F-PPDCCH carries only information about the F-PDCH sub-packet length, the use of the F-PPDCCH is optional. The subscriber station may use other means for determining the F-PDCH sub-packet length. Thus, for example, the subscriber station may decode the sub-packet for all sub-packet length hypotheses, and select the most likely one of the hypothesis.

Similarly, the F-SPDCCH 602 is utilized as defined in the 1xEV-DV proposal with the following modification. One of the values of the MAC ID of block 604 is reserved to identify that a sub-packet of the F-PDCH is to be shared. In accordance with one embodiment, the MAC ID value that identifies a sub-packet is to be shared is all ones. Because all the subscriber stations for which the shared sub-packets are intended must reliably receive the information content of channel 602, channel 602 is transmitted at power determined by the power requirement of the subscriber station, for which the control channel 602 is intended, with the worst forward link quality metric. Upon receiving the channel 602, each of the subscriber stations demodulates and decodes the MAC ID of block 604. If the MAC ID indicates that the sub-packet is for one of the subscriber stations, the identified subscriber station processes the sub-packet in accordance with the procedures outlined in the 1xEV-DV proposal.

If the MAC ID indicates that the sub-packet is to be shared, the remaining bits of block 606 are interpreted to indicate parameters of the shared sub-packet. The parameters comprise a number of subscriber stations sharing the a sub-packet. Consequently, each of the subscriber stations acquires this information, and then starts receiving the CDM channels 608($i$). Because each of the CDM channels 608($i$) is modulated by a Walsh code, the subscriber stations need to know these Walsh codes. In one embodiment, pre-determined Walsh codes are reserved for the CDM channels 608($i$). In another embodiment, the subscriber stations are notified about the Walsh codes by signaling messages. Only the number of CDM channels 608($i$) equal to the number of subscriber stations sharing the sub-packet is transmitted, and the transmission occurs only when the sub-packet is shared. In one embodiment, the CDM channels 608($i$) are transmitted concurrently, consequently, each of the subscriber stations accumulates data from all the CDM channels 608($i$), and then post processes the accumulated data. Because each of the CDM channels 608($i$) is intended for one of the subscriber stations and the base station has an information about the subscriber station forward link quality metric, the base station transmits each of the CDM channels 608($i$) at the minimum power determined by power requirement of the subscriber station.

Each of the CDM channels 608($i$) comprises information enabling the subscriber station to determine which of the CDM channels 608($i$) is intended for the subscriber station and information enabling the subscriber station to demodulate the F-PDCH. The information enabling the subscriber station to determine which of the CDM channels 608($i$) is intended for the subscriber station comprises a MAC ID 610($i$). The information enabling the subscriber station to demodulate the F-PDCH comprises an ARQ ID 612($i$), a sub-packet ID 616($i$), a packet size 618($i$), and a number of Walsh channels used 620($i$). In one embodiment, the current F-PDCCH coding and modulation is used for each of the CDM channels 608($i$). During the post processing, each of the subscriber stations demodulates the MAC ID 610($i$) of a CDM channel 608($i$). If the MAC ID 610($i$) indicates that the CDM channel 608($i$) does not contain information for the subscriber station, the subscriber station ceases further post processing of the channel and repeats the procedure for the next CDM channel 608($i$+1). If a subscriber demodulates a MAC ID 610($i$) indicating that the CDM channel 608($i$) contains information for the subscriber station, the subscriber station demodulates the remaining information, and processes the sub-packet on the F-PDCH in accordance to the gathered information.

In another embodiment utilizing the code-division of the sub-packets, the information is provided on the F-PPDCCH, the F-SPDCCH, and one CDM channel for all the subscriber stations sharing the sub-packet. Consequently, the F-PPDCCH and the F-SPDCCH have the structure as described with reference to FIG. 6. The structure of the CDM channel carries the information enabling each of the subscriber stations to demodulate the F-PDCH. The information for all the subscriber stations is time multiplexed and then encoded and modulated. Consequently, the CDM channel comprises concatenation of the CDM channels 608($i$) as described in FIG. 6. In one embodiment, the current F-SPDCCH coding and modulation is used for the CDM channel. Consequently, the method of acquiring the information is the same as described above, with the exception that all the subscriber stations demodulate and decode the whole information carried on the CDM channel. The subscriber station then examines the MAC IDs. If the subscriber station fails to find a MAC ID indicating that the subscriber station is to share the sub-packet, the subscriber station ceases further processing. If a subscriber finds a MAC ID indicating that the following portion of the CDM channel contains information for the subscriber station, the subscriber station demodulates the information, and processes the sub-packet on the F-PDCH in accordance with the gathered information.

One of ordinary skill in the art appreciates that limiting number of subscriber stations sharing the sub-packet yields further simplification of the above-described embodiments. Consequently, in one embodiment allowing only two subscriber station to share the sub-packet, the existing structure of the F-PPDCCH and a modified structure of the F-SPDCCH can be utilized. Thus, there is no need for an additional control channel.

The F-PPDCCH is utilized as defined in the 1xEV-DV proposal. One of ordinary skills in the art recognizes that because the F-PPDCCH carries only information about the F-PDCH sub-packet length, the use of the F-PPDCCH is optional. The subscriber station may use other means for determining the F-PDCH sub-packet length. Thus, for example, the subscriber station may decode the sub-packet for all sub-packet length hypotheses, and select the most likely one of the hypothesis.

Figure 7:
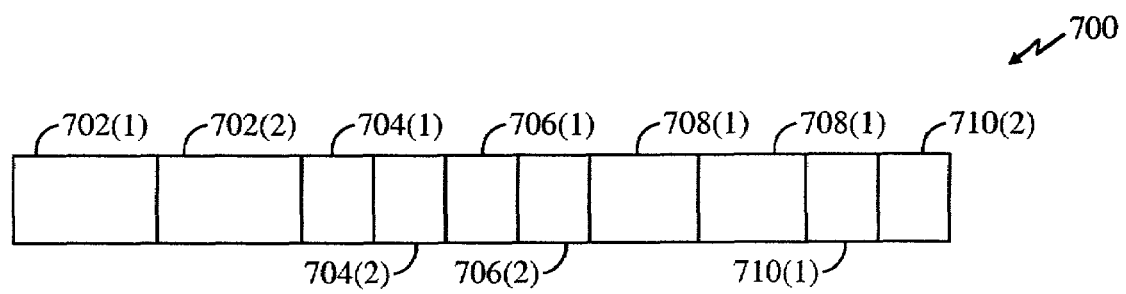
FIG. 7 illustrates a control channel structure in accordance with another embodiment.

FIG. 7 illustrates a structure of the modified F-SPDCCH 700. The modified F-SPDCCH 700 comprises information enabling the two subscriber stations to demodulate the F-PDCH. Therefore, the F-SPDCCH 700 comprises MAC IDs for two subscriber stations 702(1), 702(2), ARQ IDs 702(1), 704(2), sub-packet IDs 706(1), 706(2), encoder packet sizes 708(1), 708(2), and number of Walsh channels used 710(1), 710(2). The structure can be further simplified if the second subscriber station is assumed to use a number of Walsh channels less than or equal to the number of Walsh channels of the first subscriber station. Then the modified F-SPDCCH 700 comprises only one of the blocks 710(1), 710(2).

Because all the subscriber stations intended to share the sub-packet must reliably receive the modified F-SPDCCH 700, the modified F-SPDCCH 700 is transmitted at a power determined by the power requirement of the subscriber station with the worst forward link quality metric for which the modified F-SPDCCH 700 is intended. Upon receiving the modified F-SPDCCH 700, each of the subscriber stations demodulates the modified F-SPDCCH 700 and decodes the MAC IDs in the blocks 702(1), 702(1). If the MAC ID of the subscriber station is identical to either of the decoded MAC IDs, the subscriber station acquires the remaining information from the modified F-SPDCCH 700, and processes the sub-packet of the F-PDCH in accordance with the information.

The modified F-SPDCCH 700 is transmitted even if the F-PDCH is intended for only one subscriber station. In this case, the MAC ID 702(2), is identical to the MAC ID 702(1). Consequently, the subscriber stations ignore the interpretation of block 704(2) as ARQ ID, 706(2) as sub-packet ID, 708(2) as encoder packet size, and 710(2) as number of Walsh channels used 710(1). Consequently, these blocks can be used for any additional information. The subscriber with a MAC ID which is identical to the decoded MAC ID acquires the remaining information from the modified F-SPDCCH 700, and processes the sub-packet of the F-PDCH in accordance with procedures outlined in the 1xEV-DV proposal.

In accordance with another embodiment, the existing structures of the F-PPDCCH and the F-SPDCCH can be utilized. The F-PPDCCH is utilized as defined in the 1xEV-DV proposal. One of ordinary skills in the art recognizes that because the F-PPDCCH carries only information about the F-PDCH sub-packet length, the use of the F-PPDCCH is optional. The subscriber station may use other means for determining the F-PDCH sub-packet length. Thus, for example, the subscriber station may decode the sub-packet for all sub-packet length hypotheses, and select the most likely one of the hypothesis. The F-SPDCCH comprises information enabling one of the two subscriber stations to demodulate the F-PDCH and an indicator to specify whether another CDM control channel is transmitted. The CDM control channel comprises information enabling one subscriber station to demodulate the F-PDCH.

Figure 8:
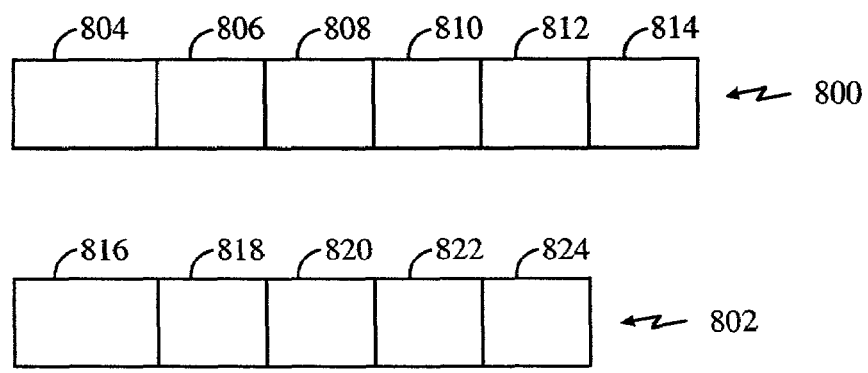
FIG. 8 illustrates a control channel structure in accordance with another embodiment.

FIG. 8 illustrates a control channel structure comprising the F-SPDCCH 800 and a CDM a control channel 802. The F-SPDCCH 800 comprises a MAC ID 804, ARQ ID 806, sub-packet ID 808, encoder packet size 810, and number of Walsh channels used 812 for one of the possible two shared channels, and a CDM indicator 814.

The CDM channel 802 comprises a MAC ID 816, ARQ ID 818, sub-packet ID 820, encoder packet size 822, and number of Walsh channels used 824 for the second shared channel if it is used. If the F-PDCH sub-packet is not shared, the CDM channel 802 is not transmitted for that sub-packet.

In one embodiment, the F-SPDCCH 800 and, if used, the CDM control channel 802 are transmitted concurrently. Because the subscriber stations do not know whether the CDM control channel 802 is transmitted or not, each of the subscriber stations accumulates data from both the F-SPDCCH 800 and the CDM channel 802, and then post processes the accumulated data. Because both subscriber stations to share the sub-packet must reliably receive the F-SPDCCH 800, the F-SPDCCH 800 is transmitted at a power determined by power requirement of the subscriber station with the worst forward link quality metric for which the F-SPDCCH 800 is intended. Because the CDM control channel 802 is intended for one of the subscriber stations and the base station has information about the subscriber station's forward link quality metric, the base station transmits the CDM control channel 802 at the minimum power determined by power requirement of the subscriber station.

Upon receiving the modified F-SPDCCH 800, each of the subscriber stations decodes the MAC ID 802. If the decoded MAC ID is identical to the subscriber station's MAC ID, the subscriber station decodes the remaining information from the F-SPDCCH 800, and processes the sub-packet of the F-PDCH in accordance with the information.

The subscriber stations, with MAC IDs which are not identical with the decoded MAC ID, decode the CDM indicator 814. If the CDM indicator 814 indicates that no CDM control channel 802 is transmitted, the subscriber stations cease further processing; otherwise the subscriber stations decode the MAC ID 816. The subscriber station, with a MAC ID which is identical with the decoded MAC ID, acquires the remaining information from the CDM control channel 802, and processes the sub-packet of the F-PDCH in accordance with the information. The subscriber stations, with MAC IDs which are not identical with the decoded MAC ID, cease further processing.

In another embodiment utilizing the time-division of the F-PDCH sub-packets, the control information is provided on the F-PPDCCH, the F-SPDCCH, and one CDM channel for each of the subscriber stations sharing the sub-packet.

The function and the structure of the F-PPDCCH is identical to the function and the structure of the F-PPDCCH as described above with regards to the CDM based F-PDCH sub-packet sharing.

Similarly, the function and the structure of the F-SPDCCH is identical to the function and the structure of the F-SPDCCH as described above with regards to the CDM based sub-packet sharing with the following modification. If the MAC ID indicates that a sub-packet of the F-PDCH is to be shared, the remaining bits of the F-SPDCCH are interpreted to indicate parameters of the shared sub-packet, which comprise a number of sub-slots into which the sub-packet is subdivided and the number of subscriber stations sharing the sub-packet. Consequently, each of the subscriber stations demodulates the modified F-SPDCCH and decodes the MAC ID. If the MAC ID indicates that the sub-packet is for the subscriber station, the identified subscriber station processes the sub-packet in accordance to procedures outlined in the 1xEV-DV proposal.

Figure 9:
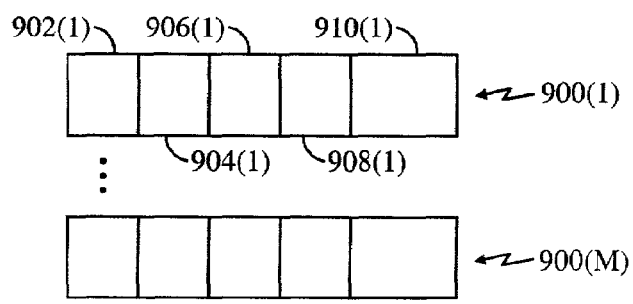
FIG. 9 illustrates a CDM channel structure in accordance with one embodiment.

If the MAC ID indicates that the sub-packet is to be shared, the subscriber stations will use the remaining bits of the F-SPDCCH to determine the number of sub-slots into which the sub-packet is subdivided and the number of subscriber stations sharing the sub-packet. Consequently, each of the subscriber stations acquires this information, and then starts receiving the TDM channels 900(i), as illustrated in FIG. 9. Because each of the CDM channels 900(i) is modulated by a Walsh code, the subscriber stations need to know these Walsh codes. In one embodiment, pre-determined Walsh codes are reserved for the CDM channels 900(i). In another embodiment, the subscriber stations is notified about the Walsh codes by signaling messages. Only the number of CDM channels 900(i) equal to the number of subscriber stations sharing the sub-packet is transmitted, and the transmission occurs only when the sub-packet is shared. In one embodiment, the CDM channels 900(i) are transmitted concurrently, consequently, each of the subscriber stations accumulates data from all the TDM channels 900(i), and then post processes the accumulated data. Because each of the CDM control channels 900(i) for the TDM-shared F-PDCH is intended for one of the subscriber stations and the base station has a information about the subscriber station forward link quality metric, the base station transmits each of the CDM control channels 900(i) at just enough power to reach the intended subscriber station reliably.

Each of the CDM control channels 900(i) comprises information enabling the subscriber station to determine which of the CDM channels 900(i) is intended for the subscriber station and information enabling the subscriber station to demodulate a F-PDCH. The information enabling the subscriber station to determine which of the CDM channels 900(i) is intended for the subscriber station comprises a MAC ID 902(i). The information enabling the subscriber station to demodulate the F-PDCH comprises an ARQ ID 904(i), a sub-packet ID 906(i), a format of the shared sub-packet 908(i), and a starting sub-slot 910(i) for each of the mobiles. In one embodiment, the current F-PDCCH coding and modulation is used for each of the CDM channels 900(i). During the post processing, each of the subscriber stations demodulates the MAC ID 902(i) of a control channel 900(i). If the MAC ID 902(i) indicates that the control channel 900(i) does not contain information for the subscriber station, the subscriber station ceases further post processing of the channel and repeats the procedure for the next control channel 900(i+1). If a subscriber demodulates a MAC ID 902(i) indicating that the control channel 900(i) contains information for the subscriber station, the subscriber station reads the remaining information, and processes the sub-packet on the F-PDCH in accordance to the gathered information.

In another embodiment utilizing the time-division of the slots, the information is provided on the F-PPDCCH, the F-SPDCCH, and one TDM channel for all the subscriber stations sharing the sub-packet. The TDM channel is modulated by the information enabling each of the subscriber stations to demodulate the F-PDCH. The information for all the subscriber stations is time multiplexed and then encoded and modulated. Consequently, the CDM channel comprises concatenation of the CDM channels 900(i) as described in FIG. 9. In one embodiment, the current F-SPDCCH coding and modulation is used for the CDM channel. Consequently, the method of acquiring the information is the same as described above, with the exception that all the subscriber stations tune to the CDM channel, demodulate and decode the whole information. The subscriber station then examines the MAC IDs. If the subscriber station fails to find a MAC ID indicating that the subscriber station is to share the sub-packet, the subscriber station ceases further processing. If a subscriber finds a MAC ID indicating that the following portion of the CDM channel contains information for the subscriber station, the subscriber station reads the rest of the information, and processes the sub-packet on the F-PDCH in accordance to the gathered information. Furthermore, each of the subscriber stations examines each portion of the F-SPDCCH containing the information about sub-slot positions. Consequently, the CDM channel does not need to contain the starting sub-slot for each subscriber station because the subscriber stations have acquired the information on the duration of sub-slots intended for the other subscriber stations.

Figure 10:
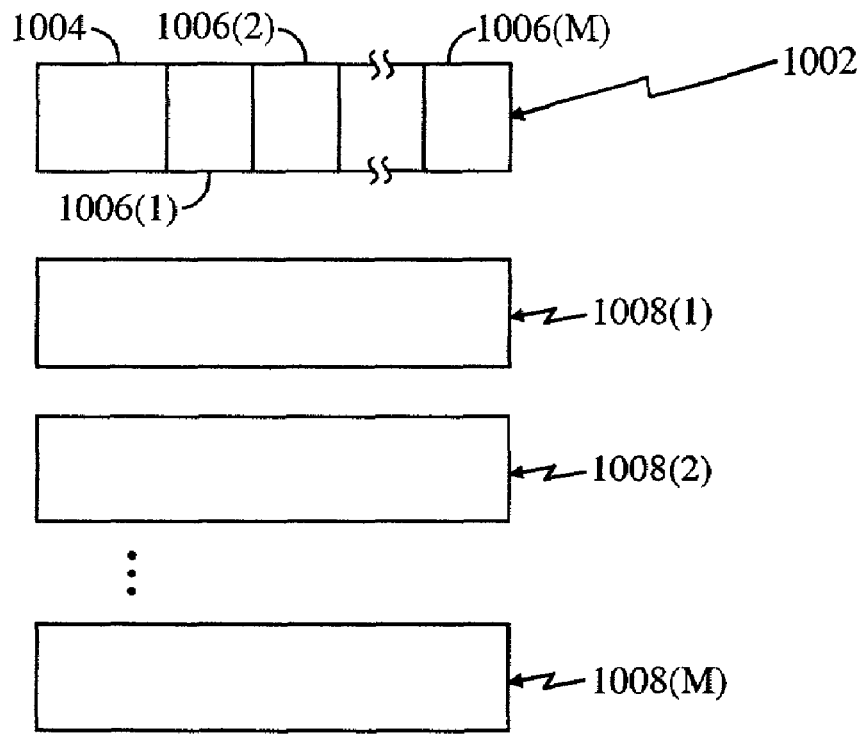
FIG. 10 illustrates a control channel structure in accordance with another embodiment.

The control channels' structure in accordance with another embodiment is illustrated in FIG. 10. Control channel 1002 comprises an indication of a number of control channels 1008(i) in block 1004. Furthermore, each of blocks 1006(i) identifies a MAC ID of a subscriber station for which information is sent on a F-PDCH. To receive the control channel 1002 the subscriber stations must know modulation parameters of the control channel 1002. In one embodiment, the modulation parameters are pre-determined. In another embodiment, the modulation parameters are provided to the subscriber stations by signaling messages. Because all subscriber stations must reliably receive the control channel 1002, the control channel 1002 is transmitted at power determined by a power requirement of the subscriber station with the worst forward link quality metric. Upon receiving the control channel 1002, each of the subscriber stations demodulates and decodes the control channel 1002. Each of the subscriber stations with MAC ID identical to the MAC IDs acquired from block 1006(i) then acquires one of the control channel 1008(i). Consequently, the number of the transmitted control channels 1008(i) is equal to the number of MAC IDs in the channel 1002. The subscriber stations with MAC IDs different from the MAC IDs acquired from block 1006(i) cease further control channel processing.

Each of the additional control channels 1008(i) comprises information enabling a subscriber station identified by one of the MAC IDs to demodulate the F-PDCH. Therefore, in one embodiment, each of the control channels comprises an ARQ channel ID, the encoder packet size, and the F-PDCH sub-packet ID, as well as information for sub-packet TDM/CDM sharing as described above.

To acquire information enabling the subscriber station identified by one of the MAC IDs in control channel 1002 to demodulate the F-PDCH, there must exist a relationship between the subscriber station MAC ID and the control channel 1008(i) comprising the information for the subscriber station. In one embodiment, the relationship is determined by a position of the blocks 1006(i) within the channel 1002, and an index of the Walsh code encoding the control channel 1008(i). Thus, for example increasing order of MAC ID position in the control channel 1002 means increasing index of the Walsh code encoding the control channel 1008(i). The relationship between the control channel's Walsh code and a MAC ID may be pre-determined or changeable by signaling messages. However, one of ordinary skills in the art appreciates that other relationships are within the scope of the invention. Because each additional control channel 1008(i) is intended for one of the subscriber stations and the base station has an information about the subscriber station forward link quality metric, the base station transmits each of the channels 1008(i) at the minimum power determined by power requirement of the subscriber station.

Once a subscriber station demodulates the appropriate control channel 1008(i), the subscriber station decodes the information enabling the demodulation of the F-PDCH, and processes the sub-packet on the F-PDCH in accordance to the gathered information.

Figure 11:
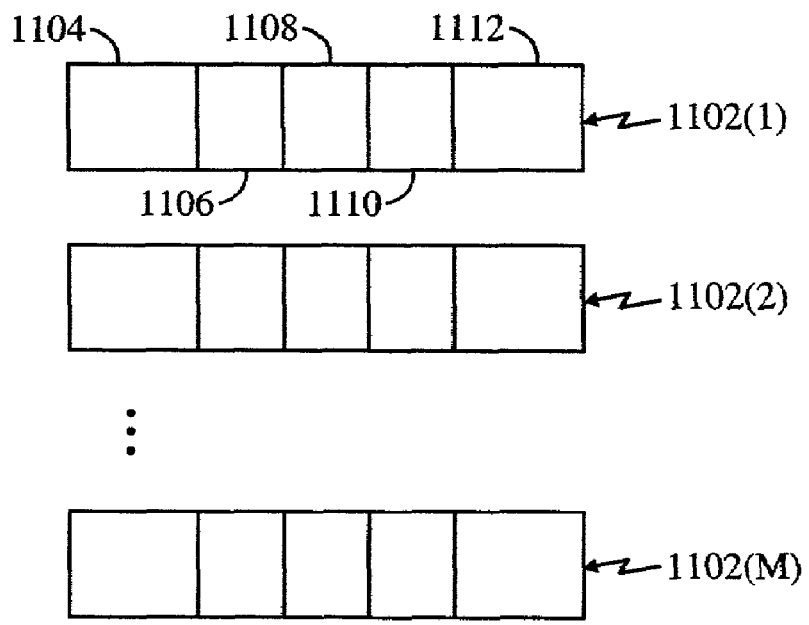
FIG. 11 illustrates a control channel structure in accordance with another embodiment.

The control channel(s) structure in accordance with another embodiment is illustrated in FIG. 11. Each of the control channels 1102(i) contains all the information a subscriber station needs to decode the F-PDCH. Therefore, in one embodiment, each of the channels 1102(i) comprises a MAC ID block 1104, an ARQ channel ID block 1106, the encoder packet size block 1108, and the F-PDCH sub-packet ID block 1110, as well as information for sub-packet TDM/CDM sharing as described above, collectively identified as block 1112. Because each of the control channels 1102(i) is intended for one of the subscriber stations and the base station has an information about the subscriber station forward link quality metric, the base station transmits each of the channels 1108(i) at the minimum power determined by power requirement of the subscriber station.

To receive the control channels 1102(i) the subscriber stations must know modulation parameters of the control channels 1102(i). In one embodiment, the modulation parameters and the number of possible control channels are pre-determined. In one embodiment, the modulation parameters comprise different Walsh codes. Because in accordance with the embodiment, there is no relationship between one subscriber station and one control channel 1102(i), the subscriber stations must demodulate all the control channels 1102(i). Although a number of transmitted control channels 1102(i) is equal to a number of subscriber stations for which information is sent on a F-PDCH because the number of subscriber stations may change in accordance with the granularity of the F-PDCH as described above, the number of transmitted control channels 1102(i) changes.

In one embodiment, the control channels 1102(i) are transmitted concurrently, consequently, each of the subscriber stations accumulates data for all the channels 1102(i), and then post processes the accumulated data. During the post processing, each of the subscriber stations demodulates one of the control channels 1102(i) and decodes a MAC ID of block 1104(i). The subscriber station with MAC ID identical to the MAC ID of block 1104(i) demodulates the remaining information, and processes the sub-packet on the F-PDCH in accordance to the gathered information. If the MAC ID of block 1104(i) indicates that the channel 1102(i) does not contain information for the subscriber station, the subscriber station ceases further post processing of the channel and repeats the procedure for the next channel 1102(i). Because as discussed, the subscriber station does not have information about the number of transmitted control channels 1102(i), unless the subscriber station finds a MAC ID indicating that the channel 1102(i) contains information for the subscriber station, the subscriber station must attempt to demodulate all possible control channels 1102(i).

Figure 12:
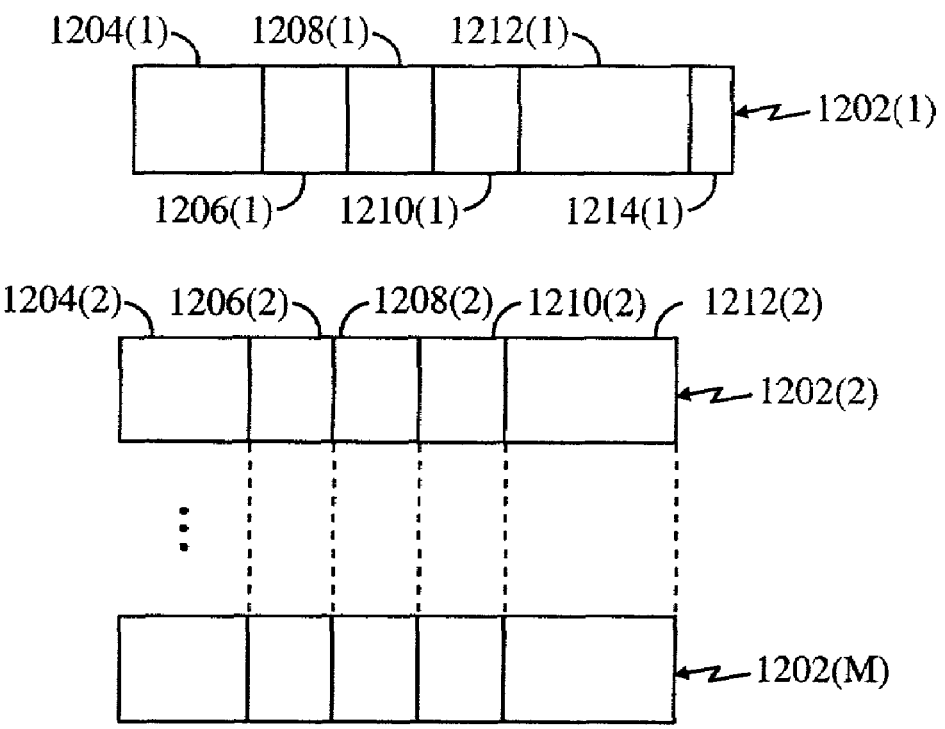
FIG. 12 illustrates a control channel structure in accordance with another embodiment.

The control channel(s) structure in accordance with another embodiment is illustrated in FIG. 12. Each of the control channels 1202(i) contains all the information a subscriber station needs to decode the F-PDCH. Therefore, in one embodiment, each of the channels 1202(i) comprises a MAC ID block 1204, an ARQ channel ID block 1206, the encoder packet size block 1208, and the F-PDCH sub-packet ID block 1210, as well as information for sub-packet TDM/CDM sharing as described above, collectively identified as block 1212. In addition, one of the control channels 1202(i), e.g., control channel 1202(1) comprises a block 1214, which identifies number of transmitted control channels 1202(i). Because it is desirable that all subscriber stations receive reliably the information content of the control channel 1202 (1), in one embodiment the control channel 1202(1) is transmitted at power determined by power requirement of the subscriber station with the worst forward link quality metric. Because each of the control channels 1202(2)-1202(m) is intended for one of the subscriber stations and the base station has an information about the subscriber station forward link quality metric, the base station transmits each of the channels 1202(2)-1202(m) at the minimum power determined by power requirement of the subscriber station.

To receive the control channels 1202(i) the subscriber stations must know modulation parameters of the control channels 1202(i). In one embodiment, the modulation parameters and the number of possible control channels are pre-determined. Furthermore, there exists a relationship between the control channels 1202(i) and the modulation parameters. In one embodiment, the modulation parameters comprise different Walsh codes, and the transmitted control channels 1202 (i) are encoded by Walsh codes with sequential indexes. However, one of ordinary skill in the art appreciates that other relationships are within the scope of the invention. Because in accordance with the embodiment, there is no relationship between one subscriber station and one control channel 1202 (i), the subscriber stations must demodulate all the transmitted control channels 1202(i). Although a number of transmitted control channels 1202(i) is equal to a number of subscriber stations for which information is sent on a F-PDCH because the number of subscriber stations may change in accordance with the granularity of the F-PDCH as described above, the number of transmitted control channels 1202(i) changes.

In one embodiment, the channels 1202(i) are transmitted concurrently, consequently, each of the subscriber stations accumulates data from all the channels 1202(i), and then post processes the accumulated data. During the post processing, each of the subscriber stations first demodulates the control channel 1202(1) and decodes a MAC ID of block 1204. The subscriber station with MAC ID identical to the MAC ID of block 1204 decodes the remaining information, and processes the sub-packet on the F-PDCH in accordance with the gathered information. The subscriber stations whose MAC IDs are not identical to the MAC ID of block 1204 decode the number of transmitted control channels 1202(i) of block 1214, cease further post processing of the control channel 1202(1), and repeat the procedure for the next channel 1208 (i). Therefore, the subscriber stations have information about the number of transmitted control channels 1202(i). Because as discussed there exists a relationship between the number of transmitted control channels 1202(i), unless the subscriber station finds a MAC ID indicating that the channel 1202(i) contains information for the subscriber station, the subscriber station attempts to demodulate only the transmitted channels 1202(i).

The control channel structure in accordance with another embodiment is identical to the control channel structure as illustrated in FIG. 12, with the exception of the relationship between the control channels 1202(*i*) and the modulation parameters. As explained above, it is desirable that all subscriber stations receive reliably the information content of the control channel 1202(1), in one embodiment the control channel 1202(1) is transmitted at power determined by power requirement of the subscriber station with the worst forward link quality metric. Furthermore, each of the control channels 1202(2)-1202(*m*) is intended for one of the subscriber stations and the base station has an information about the subscriber station forward link quality metric, consequently, the base station transmits each of the channels 1202(2)-1202(*m*) at the minimum power determined by power requirement of the subscriber station. The transmitted control channels 1202(*i*) are ordered in accordance with the transmit power, and are modulated by an ordered set of modulation parameters. In one embodiment, the modulation parameters comprise different Walsh codes, and the control channel 1202(*i*) are encoded by Walsh codes with increasing indexes in relation to the increasing transmit power. However, one of ordinary skills in the art appreciates that other relationships are within the scope of the invention.

In one embodiment, the channels 1202(*i*) are transmitted concurrently, consequently, each of the subscriber stations accumulates data from all the channels 1202(*i*), and then post processes the accumulated data. During the post processing, each of the subscriber stations first demodulates the control channel 1202(1) and decodes a MAC ID of block 1204. The subscriber station with MAC ID identical to the MAC ID of block 1204 decodes the remaining information, and processes the sub-packet on the F-PDCH in accordance with the gathered information.

The subscriber stations whose MAC IDs are not identical to the MAC ID of block 1204 decode the number of transmitted control channels 1202(*i*) of block 1214, cease further post processing of the control channel 1202(1), and determine the control channel 1202(2)-1202(*m*) to be demodulated next. Because of the above-described relationship between the control channel's 1202(*i*) power and index of the Walsh code by which the control channel's 1202(*i*) is encoded, when a subscriber station attempts to decode one of the control channels 1202(2)-1202(*m*) and the decoding fails, then the subscriber station knows that decoding of any of the channels 1202(2)-1202(*m*) sent at lower power is likely to fail too. Consequently, the subscriber station next attempts to decode one of the control channels 1202(2)-1202(*m*) sent at a higher power. Therefore, one of ordinary skills in the art appreciates that any determination method based on ordered set may be used.

For example, in accordance with one embodiment, the determination method may utilize binary search method. If the subscriber station experiences the forward link with a good quality metric, the subscriber station demodulates the control channel with the lowest power 1202(*m*), thus encoded by Walsh code with the highest index m. If the decoding fails, the subscriber station repeats the process with the control channel with the medium power 1202(*m*/2), thus encoded by Walsh code with the index m/2. If the decoding is successful, but the MAC ID indicates that the control channel 1202(*m*/2) does not contain information for the subscriber station, the subscriber station repeats the process with a control channel between 1202(*m*/2) and 1202(*m*). The method is repeated until the subscriber station exhaust all the control channels between 1202(*m*/2) and 1202(*m*), or finds a control channel 1202(*i*) with MAC ID indicating that the control channel 1202(*i*) is intended for the subscriber station.

In another embodiment, the subscriber station whose MAC ID is not identical to the MAC ID of block 1204 measures the power of the control channel 1202(*i*) from the range 1202(2)-1202(*m*). If the measured power is higher than the power required by the subscriber station, the control channel 1202(*i*) containing the information for the subscriber station is likely in the range 1202(*i*)-1202(*m*). The subscriber station can continue measuring the power, using any determination method, e.g., the above-described binary search or select a control channel from the determined range and attempt a demodulation.

The control channel structure in accordance with another embodiment is identical to the control channel structure as illustrated in FIG. 12, with the exception of the relationship between the control channels 1202(*i*) and the modulation parameters. In accordance with the embodiment, the transmitted control channels 1202(*i*) are ordered in accordance with the value of MAC IDs in block 1204, and are modulated by an ordered set of modulation parameters. In one embodiment, the modulation parameters comprise different Walsh codes, and the control channel 1202(*i*) are encoded by Walsh codes with increasing indexes in relation to the increasing value of MAC IDs in block 1204. However, one of ordinary skills in the art appreciates that other relationships are within the scope of the invention.

Consequently, a subscriber station may use any determination method applicable for ordered set, e.g., one of the above-described methods.

Figure 13:
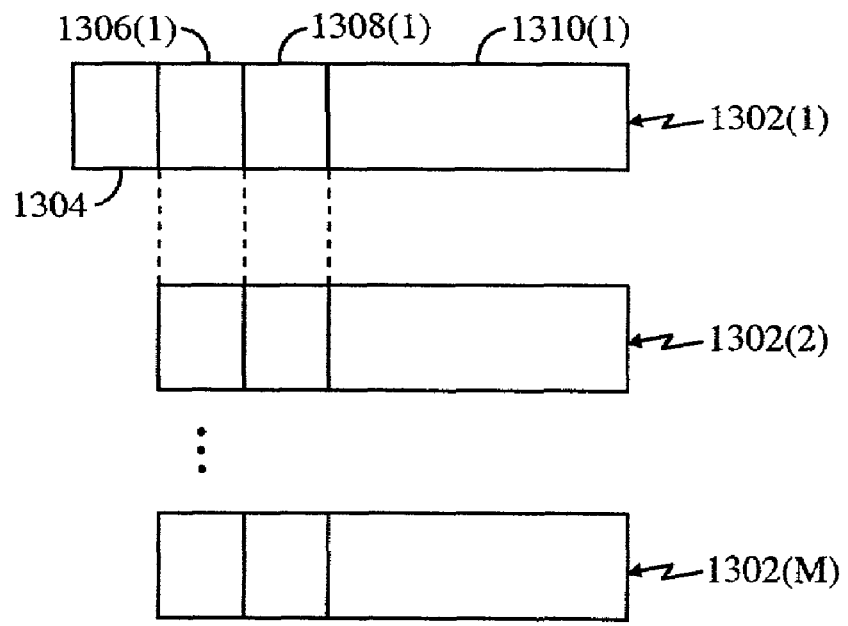
FIG. 13 illustrates a control channel structure in accordance with another embodiment.

The control channel(s) structure in accordance with another embodiment is illustrated in FIG. 13. Each of the control channels 1302(*i*) contains all the information a subscriber station needs to decode the F-PDCH. Therefore, in one embodiment, each of the channels 1302(*i*) comprises a MAC ID block 1306(*i*) identifying a subscriber station for which the channel 1302(*i*) is intended, a partial MAC ID block 1308(*i*) identifying subscriber stations for which another control channel 1302(*i*) is intended, and information block 1310(*i*), enabling a subscriber station identified by the MAC ID of block 1306(*i*) to demodulate the F-PDCH. In addition, one of the control channels 1302(*i*), e.g., a control channel 1302(1) comprises a block 1304 identifying number of control channels 1302(*i*). The identification of a partial MAC ID is an implementation issue. In one embodiment, the MAC ID is expressed as an 8-bit number. Therefore, a subset of the bits identifies a partial MAC ID. In one embodiment, the subset comprises the most significant bits of a MAC ID.

To receive the control channels 1302(*i*) the subscriber stations must know modulation parameters of the control channels 1302(*i*). In one embodiment, the modulation parameters and the number of possible control channels are pre-determined. In one embodiment, the modulation parameters comprise different Walsh codes. However, one of ordinary skills in the art appreciates that other relationships are within the scope of the invention. Furthermore, there exists a relationship between the control channels 1302(2)-1302(*m*) and the partial MAC IDs. The relationship is determined by a method the subscriber stations with MAC ID matching the partial MAC ID a control channel 1302(*i*) use to select the next control channel 1302(*i*) to demodulate. One of ordinary skills in the art appreciates that such a method, consequently, the relationships is an implementation issue. In accordance with one embodiment, the partial MAC ID from block 1308(*i*) of channel 1302(*i*) identifies a control channel 1302(*m*−*i*−1).

Because all subscriber stations must reliably receive the control channel 1302(1), the control channel 1302(1) is transmitted at power determined by power requirement of the subscriber station with the worst forward link quality metric. Because each of the control channel 1302(2)-1302(m) is intended for one of the subscriber stations and the base station has an information about the subscriber station forward link quality metric, the base station transmits each of the channels 1308(i) at the minimum power determined by power requirement of the subscriber station.

In one embodiment, the channels 1302(i) are transmitted concurrently, consequently, each of the subscriber stations accumulates data from all the channels 1202(i), and then post processes the accumulated data. During the post processing, each of the subscriber stations first demodulates the control channel 1202(1) and decodes a MAC ID of block 1306(1). The subscriber station with MAC ID identical to the MAC ID of block 1306(1) decodes the remaining information, and processes the sub-packet on the F-PDCH in accordance with the gathered information.

If the block 1304 indicates that there are no additional control channels 1302(i), the determination method ends.

If the block 1304 indicates that there are m additional control channels 1302(i), the determination proceeds as follows.

The subscriber stations with MAC ID matching the partial MAC ID of block 1108(1) demodulate and decode the control channel 1302(m), to acquire the MAC ID of block 1306(m). The subscriber station with MAC ID identical to the MAC ID of block 1306(m) demodulates and decodes the remaining information of the control channel 1302(m), and processes the sub-packet on the F-PDCH in accordance to the gathered information. The subscriber station with MAC ID not matching the MAC ID of block 1316(m) demodulates the next control channel 1302(2) as described below. Since the subscriber station has already processed the control channel 1302(m), the subscriber station continuing processing and encountering control channel 1302(m) can cease further processing.

The subscriber stations with MAC ID not matching the partial MAC ID of block 1308(1) demodulate the next control channel 1302(i), i.e., the control channel 1302(2). The subscriber station with MAC ID identical to the MAC ID of block 1306(2) decodes the remaining information of the control channel 1302(2), and processes the sub-packet on the F-PDCH in accordance to the gathered information. The subscriber stations with MAC ID matching the partial MAC ID of block 1308(2) follow the processing as outlined with respect to MAC ID in block 1308(1). (Thus, the subscriber stations demodulate and decode the control channel 1308(m−1), to acquire the MAC ID of block 1306(m−1)).

The method is repeated until the subscriber station exhausts all the control channels 1302(i), or finds a control channel 1302(i) with MAC ID indicating that the control channel 1302(i) is intended for the subscriber station.

Code Channel Assignment Signaling

As discussed, the control channel structure of the invention may utilize the control channels of the 1xEV-DV proposal, according to the above-described embodiment. Consequently, the control channel structure of the invention must preserve or improve the functionality of the control channels of the 1xEV-DV proposal.

In accordance to the 1xEV-DV proposal, the F-PDCH sub-packet de-multiplexed into a variable number of pairs (In-phase and Quadrature) of parallel streams, and each of the parallel streams is covered with a distinct 32-ary Walsh code. The F-PDCH Walsh codes are assigned from a Walsh Space List of 28 possible assignments, starting from the top of this list.

TABLE 1

Default F-PDCH Walsh Space List
32-ary Walsh Codes

| 31 |
| 15 |
| 23 |
| 7 |
| 27 |
| 11 |
| 19 |
| 3 |
| 29 |
| 13 |
| 21 |
| 5 |
| 25 |
| 9 |
| 30 |
| 14 |
| 22 |
| 6 |
| 26 |
| 10 |
| 18 |
| 2 |
| 28 |
| 12 |
| 20 |
| 4 |
| 24 |
| 8 |

When using the F-PDCH the Walsh code assignment for the F-PPDCCH, F-SPDCCH, and the F-PDCH. Furthermore, for the F-PDCH, number of such codes and the Walsh assignments of such codes are required. The number of Walsh codes in use for the F-PDCH is transmitted on the F-SPDCCH. A system and a method for signaling the Walsh space assignment is disclosed in co-pending application serial number 60/297,105 entitled "HANDLING THE WALSH SPACE INDICATOR FOR 1XEV-DV," filed Jun. 7, 2001, and assigned to the assignee of the present invention.

In accordance with one embodiment of the present invention, the Walsh space is assigned in accordance with a power of the F-SPDCCH. In one embodiment, the assignment starts with a highest power F-SPDCCH and the lowest Walsh space. Accordingly, the lowest portion of the Walsh space is assigned by the highest power F-SPDCCH, the next lower portion of the Walsh space is assigned by the second highest power F-PDCH, until all the F-SPDCCH are exhausted. To save power and capacity of the F-SPDCCH, instead of listing the individual Walsh code indexes, each in the F-SPDCCH comprises the number of Walsh codes used.

For example, referring to Table 1, if the highest power F-SPDCCH assigns the Walsh space comprising the Walsh codes with indexes 31, 15, 23, 7, 27, and 11, the highest power F-SPDCCH comprises the number 6, which is the number of Walsh codes. Similarly, if the second highest power F-SPDCCH assigns the Walsh space comprising the Walsh codes with indexes 19, 3, 29, 13, 21, 5, 25, the second highest power F-SPDCCH comprises the number 6.

The subscriber station processes the plurality of F-SPDCCHs in accordance with the above-disclosed embodiments, to obtain the number of Walsh codes from each of the plurality of the F-SPDCCHs. The subscriber station further measures power of each of the plurality of the F-SPDCCH, and orders the obtained numbers of Walsh codes with the measured power. Because the subscriber station is provided with the Walsh Space List, the subscriber station can associate each of the obtained number of Walsh codes with the Walsh codes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for processing shared sub-packets in a communication system, the method comprising:
    generating a first control channel comprising (a) an indicator that a sub-packet of a traffic channel is to be shared by a plurality of subscriber stations, the sub-packets comprising at least one slot, the slot comprising a variable number of sub-slots including at least a first set of sub-slots and a second set of sub-slots, the first set of sub-slots comprising a first data transmission assigned to a first subscriber station, the second set of sub-slots comprising a second data transmission assigned to a second subscriber station, the second data transmission different than the first data transmission, and (b) parameters of the shared sub-packet of the traffic channel including a variable number of subscriber stations sharing the sub-packet of the traffic channel; and
    generating at least one second control channel only if the sub-packet is shared, the number of second control channels equal to the variable number of subscriber stations sharing the sub-packet of the traffic channel, each of said at least one second control channel comprising (a) an identity of at least one subscriber station intended to share the sub-packet and (b) information enabling the subscriber station to demodulate the traffic channel.

2. The method as claimed in claim 1, wherein said parameters of the traffic channel comprise:
    the number of subscriber stations sharing the sub-packet of the traffic channel.

3. The method as claimed in claim 2, wherein said information enabling the subscriber station to demodulate the traffic channel comprises:
    a number of code channels encoding the shared sub-packet of the traffic channel.

4. The method as claimed in claim 1, further comprising:
    transmitting the first control channel at a power required by a subscriber station with a worst forward link quality metric among a plurality of subscriber stations for which the first control channel is intended.

5. The method as claimed in claim 1, further comprising:
    transmitting each of the at least one second control channel at a minimum power required by a subscriber station for which the at least one second control channel is intended.

6. The method as claimed in claim 1, wherein said parameters of the traffic channel comprise:
    a first number of sub-divisions of the sub-packet of the traffic channel, and a second number of subscriber stations sharing the sub-packet.

7. The method as claimed in claim 6, wherein said information enabling the subscriber station to demodulate the traffic channel comprises:
    a starting sub-division of the sub-packet of the traffic channel for the subscriber station.

8. A method for processing shared sub-packets at a first subscriber station, the method comprising:
    at the first subscriber station, demodulating a first control channel to determine whether a sub-packet of a traffic channel is to be shared by a plurality of subscriber stations;
    if the sub-packet of the traffic channel is to be shared, determining a number of subscriber stations sharing the sub-packet of the traffic channel and multiplexing of the traffic channel in accordance with said demodulated first control channel;

demodulating a second control channel comprising (a) an identity of a subscriber station intended to share the sub-packets and (b) information enabling the subscriber station intended to share the sub-packets to demodulate the traffic channel; and if the subscriber station identity of the second control channel matches the identity of the first subscriber station, demodulating the traffic channel in accordance with said determined multiplexing and the enabling information.

9. The method as claimed in claim 8, further comprising:
if the subscriber station identity of the second control channel does not match the identity of the first subscriber station and a third control channel is transmitted, demodulating for the third control channel.

10. The method as claimed in claim 8, wherein said demodulating a first control channel to determine whether the sub-packet of the traffic channel is to be shared comprises:
demodulating a pre-determined forward packet data control channel.

11. The method as claimed in claim 8, wherein said demodulating the traffic channel in accordance with said determined multiplexing and the enabling information comprises:
determining a size of traffic channel unit and a number of code channels in accordance with the enabling information if the traffic channel unit is code multiplexed; and
demodulating the sub-packet.

12. The method as claimed in claim 8, wherein said demodulating the traffic channel in accordance with the enabling information comprises:
determining a number of sub-divisions of the sub-packet and a starting sub-division in accordance with the enabling information if the sub-packet is time multiplexed; and demodulating the sub-packet.

13. A method for processing shared sub-packets in a communication system, the method comprising:
generating a first control channel comprising (a) an indicator that a sub-packet of a traffic channel is to be shared by a plurality of subscriber stations and (b) parameters of the shared sub-packet of the traffic channel;
generating at least one second control channel, each of said at least one second control channel comprising (a) an identity of at least one subscriber station intended to share the sub-packet and (b) information enabling the subscriber station to demodulate the traffic channel;
transmitting the control channels;
at a first subscriber station, demodulating the received first control channel;
determining a number of subscriber stations sharing the sub-packet of the traffic channel and multiplexing of the traffic channel in accordance-with said demodulated first control channel;
demodulating a second control channel comprising (a) an identity of a subscriber station and (b) information enabling the subscriber station intended to share the sub-packet to demodulate the traffic channel; and
if the subscriber station identity of the second control channel matches an identity of the first subscriber station, demodulating the traffic channel in accordance with said determined multiplexing and the enabling information.

14. The method as claimed in claim 13, wherein said parameters of the traffic channel comprise:
a number of subscriber stations sharing the sub-packet of the traffic channel.

15. The method as claimed in claim 14, wherein said information enabling the subscriber station to demodulate the traffic channel comprises:
a number of code channels encoding shared sub-packet of the traffic channel.

16. The method as claimed in claim 13, further comprising:
transmitting the first control channel at a power required by a subscriber station with a worst forward link quality metric among a plurality of subscriber stations for which the first control channel is intended.

17. The method as claimed in claim 13, further comprising:
transmitting each of the at least one second control channel at a minimum power required by a subscriber station for which the at least one second control channel is intended.

18. The method as claimed in claim 13, wherein said parameters of the traffic channel comprise:
a first number of sub-divisions of the sub-packet of the traffic channel, and a second number of subscriber stations sharing the sub-packet.

19. The method as claimed in claim 18, wherein said information enabling the subscriber station to demodulate the traffic channel comprises:
a starting sub-division of the sub-packet of the traffic channel for the subscriber station.

20. The method as claimed in claim 13, further comprising:
if the subscriber station identity of the second control channel does not match the identity of the first subscriber station and a third control channel is transmitted demodulating the third control channel.

21. The method as claimed in claim 13, wherein said demodulating a first control channel to determine whether the sub-packet of the traffic channel is to be shared comprises:
demodulating a pre-determined forward packet data control channel.

22. The method as claimed in claim 15, wherein said demodulating the traffic channel in accordance with said determined multiplexing and the enabling information comprises:
determining a size of traffic channel unit and a number of code channels in accordance with the enabling information if the traffic channel unit is code multiplexed; and
demodulating the traffic channel unit.

23. The method as claimed in claim 18, wherein said demodulating the traffic channel in accordance with the enabling information comprises:
determining a number of sub-divisions of the sub-packet and a starting sub-division in accordance with the enabling information if the sub-packet is time multiplexed; and
demodulating the traffic channel sub-packet.

24. The method of claim 1, wherein two sub-slots include data intended for two subscriber stations.

25. The method of claim 1, wherein X number of sub-slots include data intended for a first subscriber station, Y number of sub-slots including data intended for a second subscriber station, and X is different from Y.

26. The method of claim 10, wherein demodulating a first control channel to determine whether the sub-packet of the traffic channel is to be shared further comprises comparing a subscriber station identity block of the pre-determined forward packet data control channel with a reserved value.

27. A method for processing shared sub-packets in a communication system, the method comprising:
generating a first control channel comprising (a) an indicator that a sub-packet of a traffic channel is to be shared by a plurality of subscriber stations, the sub-packets comprising at least one slot, the slot comprising at least two sub-slots, and (b) parameters of the shared sub-packet of the traffic channel; and generating at least one second control channel, each of said at least one second control channel comprising (a) an identity of at least one subscriber station intended to share the sub-packet and (b) information enabling the subscriber station to demodulate the traffic channel;

wherein the first control channel is configured to be received by a first subscriber station configured to demodulate the first control channel to determine whether a sub-packet of a traffic channel is to be shared by a plurality of subscriber stations and if the sub-packet of the traffic channel is to be shared, a number of subscriber stations sharing the sub-packet of the traffic channel is determined and the traffic channel multiplexed in accordance with said demodulated first control channel;

and further wherein the second control channel, is configured to be received and demodulated and comprises (a) an identity of a subscriber station intended to share the sub-packets and (b) information enabling the subscriber station intended to share the sub-packets to demodulate the traffic channel; and if the subscriber station identity of the second control channel matches the identity of the first subscriber station, the traffic channel is configured to be received and demodulated in accordance with said determined multiplexing and the enabling information.

28. The method as claimed in claim 27, wherein said parameters of the traffic channel comprise:
a number of subscriber stations sharing the sub-packet of the traffic channel.

29. The method as claimed in claim 28, wherein said information enabling the subscriber station to demodulate the traffic channel comprises:
a number of code channels encoding the shared sub-packet of the traffic channel.

30. The method as claimed in claim 27, further comprising:
transmitting the first control channel at a power required by a subscriber station with a worst forward link quality metric among a plurality of subscriber stations for which the first control channel is intended.

31. The method as claimed in claim 27, further comprising:
transmitting each of the at least one second control channel at a minimum power required by a subscriber station for which the at least one second control channel is intended.

32. The method as claimed in claim 27, wherein said parameters of the traffic channel comprise:
a first number of sub-divisions of the sub-packet of the traffic channel, and a second number of subscriber stations sharing the sub-packet.

33. The method as claimed in claim 32, wherein said information enabling the subscriber station to demodulate the traffic channel comprises:
a starting sub-division of the sub-packet of the traffic channel for the subscriber station.

34. A communication device comprising:
a base station configured to generate a first control channel and at least one second control channel, wherein the first control channel comprises:
an indicator that a sub-packet of a traffic channel is to be shared by a plurality of subscriber stations, the sub-packets comprising at least one slot, the slot comprising a variable number of sub-slots including at least a first and second sub-slot, the first sub-slot comprising a first data transmission, the second sub-slot comprising a second data transmission different than the first data transmission, and parameters of the shared sub-packet of the traffic channel including a variable number of subscriber stations sharing the sub-packet of the traffic channel;

and further wherein the at least one second control channel is generated only if the sub-packet is shared, the number of second control channels equal to the variable number of subscriber stations sharing the sub-packet of the traffic channel, wherein the at least one second control channel comprises:
an identity of at least one subscriber station intended to share the sub-packet; and
information enabling the subscriber station to demodulate the traffic channel.

35. The communication device as claimed in claim 34, wherein said parameters of the traffic channel comprise:
the number of subscriber stations sharing the sub-packet of the traffic channel.

36. The communication device as claimed in claim 35, wherein said information enabling the subscriber station to demodulate the traffic channel comprises:
a number of code channels encoding the shared sub-packet of the traffic channel.

37. The communication device as claimed in claim 34, wherein the first control channel is provided at a power required by a subscriber station with a worst forward link quality metric among a plurality of subscriber stations for which the first control channel is intended.

38. The communication device as claimed in claim 34, wherein at least one second control channel is provided at a minimum power required by a subscriber station for which the at least one second control channel is intended.

39. The communication device as claimed in claim 34, wherein said parameters of the traffic channel comprise:
a first number of sub-divisions of the sub-packet of the traffic channel, and a second number of subscriber stations sharing the sub-packet.

40. The communication device as claimed in claim 39, wherein said information enabling the subscriber station to demodulate the traffic channel comprises:
a starting sub-division of the sub-packet of the traffic channel for the subscriber station.

41. A communication apparatus comprising:
a first subscriber station configured to process shared sub-packets and demodulate a first control channel to determine whether a sub-packet of a traffic channel is to be shared by a plurality of subscriber stations;

wherein if the sub-packet of the traffic channel is to be shared, the number of subscriber stations sharing the sub-packet of the traffic channel is determined and the traffic channel is multiplexed in accordance with said demodulated first control channel;

further wherein the first subscriber station is configured to demodulate a second control channel comprising (a) an identity of a subscriber station intended to share the sub-packets and (b) information enabling the subscriber station intended to share the sub-packets to demodulate the traffic channel; and if the subscriber station identity of the second control channel matches the identity of the first subscriber station, the first subscriber station demodulates the traffic channel in accordance with said multiplexing and the enabling information.

42. The communication apparatus as claimed in claim 41, further comprising:

if the subscriber station identity of the second control channel does not match the identity of the first subscriber station and a third control channel is transmitted, demodulating for the third control channel.

43. The communication apparatus as claimed in claim 41, wherein the first subscriber station demodulating the first control channel to determine whether the sub-packet of the traffic channel is to be shared comprises:
the first subscriber station demodulating a pre-determined forward packet data control channel.

44. The communication apparatus as claimed in claim 41, wherein the first subscriber station demodulating the traffic channel in accordance with said multiplexing and the enabling information comprises:
determining a size of traffic channel unit and a number of code channels in accordance with the enabling information if the traffic channel unit is code multiplexed; and
demodulating the sub-packet.

45. The communication apparatus as claimed in claim 41, wherein the first subscriber station demodulating the traffic channel in accordance with the enabling information comprises:
determining a number, of sub-divisions of the sub-packet and a starting sub-division in accordance with the enabling information if the sub-packet is time multiplexed; and
demodulating the sub-packet.

46. An apparatus configured to process shared sub-packets in a communication system, comprising:
means for generating a first control channel comprising (a) an indicator that a sub-packet of a traffic channel is to be shared by a plurality of subscriber stations, the sub-packets comprising at least one slot, the slot comprising a varying amount of sub-slots including at least a first and second sub-slots, the first sub-slot comprising a first data transmission, the second sub-slot comprising a second data transmission different than the first data transmission, and (b) parameters of the shared sub-packet of the traffic channel including a varying amount of subscriber stations sharing the sub-packet of the traffic channel; and
means for generating at least one second control channel only if the sub-packet is shared, the amount of second control channels generated equal to the varying amount of subscriber stations sharing the sub-packet of the traffic channel, each of said at least one second control channel comprising (a) an identity of at least one subscriber station intended to share the sub-packet and (b) information enabling the subscriber station to demodulate the traffic channel.

47. An apparatus configured to process shared sub-packets, comprising:
means for demodulating a first control channel to determine whether a sub-packet of a traffic channel is to be shared by a plurality of subscriber stations;
means for determining a number of subscriber stations sharing the sub-packet of the traffic channel and multiplexing of the traffic channel in accordance with said demodulated first control channel if the sub-packet of the traffic channel is to be shared;
means for demodulating a second control channel comprising (a) an identity of a subscriber station intended to share the sub-packets and (b) information enabling the subscriber station intended to share the sub-packets to demodulate the traffic channel; and
means for demodulating the traffic channel in accordance with said determined multiplexing and the enabling information if the subscriber station identity of the second control channel matches the identity of a first subscriber station.

48. A computer readable medium encoded with computer executable instructions, wherein the instructions are executable by a computer processor and configured to perform a method comprising:
generating a first control channel comprising (a) an indicator that a sub-packet of a traffic channel is to he shared by a plurality of subscriber stations, the sub-packets comprising at least one slot, the slot comprising a variable amount of sub-slots including at least a first and second sub-slot, the first sub-slot comprising a first data transmission, the second sub-slot comprising a second data transmission different than the first data transmission, and (b) parameters of the shared sub-packet of the traffic channel including a variable amount of subscriber stations sharing the sub-packet of the traffic channel; and
generating at least one second control channel only if the sub-packet is shared, the amount of second control channels generated equal to the variable amount of subscriber stations sharing the sub-packet of the traffic channel, each of said at least one second control channel comprising (a) an identity of at least one subscriber station intended to share the sub-packet and (b) information enabling the subscriber station to demodulate the traffic channel.

49. A computer readable medium encoded with computer executable instructions, wherein the instructions are executable by a computer processor and configured to perform a method comprising:
demodulating a first control channel to determine whether a sub-packet of a traffic channel is to be shared by a plurality of subscriber stations;
determining a number of subscriber stations sharing the sub-packet of the traffic channel and multiplexing of the traffic channel in accordance with said demodulated first control channel if the sub-packet of the traffic channel is to be shared;
demodulating a second control channel comprising (a) an identity of a subscriber station intended to share the sub-packets and (b)information enabling the subscriber station intended to share the sub-packets to demodulate the traffic channel; and
demodulating the traffic channel in accordance with said determined multiplexing and the enabling information if the subscriber station identity of the second control channel matches the identity of a first subscriber station.

* * * * *

UNITED STATES PATENT AND TRADEMARK OFFICE
CERTIFICATE OF CORRECTION

PATENT NO. : 7,599,334 B2 Page 1 of 1
APPLICATION NO. : 09/981027
DATED : October 6, 2009
INVENTOR(S) : Odenwalder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,599,334 B2 | |
| APPLICATION NO. | : 09/981027 | |
| DATED | : October 6, 2009 | |
| INVENTOR(S) | : Odenwalder et al. | |

It is certified that error appears in the above-identified patent and that said Letters Patent is hereby corrected as shown below:

Column 21, line 54, claim 13; "accordance-with" to read as --accordance with--

Column 21, line 66, claim 14: "a number" to read as --the number--

Column 22, line 4, claim 15: "encoding shared" to read as --encoding the shared--

Column 22, line 29, claim 20: "is transmitted" to read as --is transmitted,--

Column 22, line 32, claim 27: "and(b)" to read as --and (b)--

Column 22, line 34, claim 27: "(a)" to read as --(c)--

Column 23, line 2, claim 27: "(b)" to read as --(d)--

Column 23, line 19, claim 27: "channel," to read as --channel--

Column 25, line 23, claim 45: "number,of" to read as --number of--

Column 25, line 47, claim 46: "(a)" to read as --(c)--

Column 25, line 48, claim 46: "(b)" to read as --(d)--

Column 26, line 18, claim 48: "he shared" to read as --be shared--

Signed and Sealed this
Fourteenth Day of June, 2011

David J. Kappos
*Director of the United States Patent and Trademark Office*